United States Patent
Zhong et al.

(10) Patent No.: US 11,173,796 B2
(45) Date of Patent: Nov. 16, 2021

(54) ELECTRIC VEHICLE CHARGING CIRCUIT BREAKER

(71) Applicant: EATON INTELLIGENT POWER LIMITED, Dublin (IE)

(72) Inventors: Kevin Zhong, Shanghai (CN); Tom Xiong, Shanghai (CN); Darron Kirby Lacey, Peachtree City, GA (US); Sophia Zhang, Shanghai (CN); Lily Du, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 139 days.

(21) Appl. No.: 16/818,660

(22) Filed: Mar. 13, 2020

(65) Prior Publication Data

US 2020/0220365 A1 Jul. 9, 2020

Related U.S. Application Data

(63) Continuation of application No. 15/350,244, filed on Nov. 14, 2016, now Pat. No. 10,630,089.

(51) Int. Cl.
*B60L 53/14* (2019.01)
*H02H 3/16* (2006.01)
(Continued)

(52) U.S. Cl.
CPC ............ *B60L 53/14* (2019.02); *B60L 53/305* (2019.02); *B60L 53/31* (2019.02); *B60L 53/665* (2019.02); *H02J 7/007* (2013.01); *H02J 7/0013* (2013.01); *H02J 7/0027* (2013.01); *H02J 7/0029* (2013.01); *H02J 7/0047* (2013.01); *H02J 7/027* (2013.01); *H02J 7/00034* (2020.01);
(Continued)

(58) Field of Classification Search
CPC ...... B60L 53/14; B60L 53/305; B60L 53/665; B60L 53/31; H03J 7/0029; H02H 3/16
See application file for complete search history.

(56) References Cited

U.S. PATENT DOCUMENTS

| 4,685,022 A | * | 8/1987 | Nichols, III | ............. | H02H 3/33 |
| | | | | | 361/42 |
| 5,488,303 A | * | 1/1996 | Bagalini | ................ | H02H 3/334 |
| | | | | | 324/509 |

(Continued)

OTHER PUBLICATIONS

European Patent Office, "Extended European Search Report" (corresp. to EP 17201470.6), dated Apr. 16, 2018, 10 pp.

(Continued)

*Primary Examiner* — Scott Bauer
(74) *Attorney, Agent, or Firm* — Eckert Seamans Cherin & Mellott, LLC

(57) ABSTRACT

An electric vehicle charging circuit breaker for charging an electric vehicle with power from a power source. The electric vehicle charging circuit breaker includes a circuit protection unit structured to provide circuit protection between the power source and the electric vehicle, an electric vehicle charging unit structured to control charging of the electric vehicle, a metering unit structured to meter power flowing between the power source and the electric vehicle, and a display unit structured to display information including at least one of metering information and a status of electric vehicle charging.

20 Claims, 4 Drawing Sheets

(51) Int. Cl.
- H02J 7/00 (2006.01)
- H02J 7/02 (2016.01)
- B60L 53/66 (2019.01)
- B60L 53/31 (2019.01)
- B60L 53/30 (2019.01)

(52) U.S. Cl.
CPC .......... *H02J 7/00304* (2020.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(56) References Cited

U.S. PATENT DOCUMENTS

| | | | |
|---|---|---|---|
| 6,545,574 B1 | 4/2003 | Seymour et al. | |
| 6,876,528 B2 * | 4/2005 | Macbeth | G01R 15/183 |
| | | | 361/42 |
| 8,513,964 B2 * | 8/2013 | Yue | H02H 3/335 |
| | | | 324/750.3 |
| 2010/0013436 A1 | 1/2010 | Lowenthal et al. | |
| 2011/0204849 A1 | 8/2011 | Mukai et al. | |
| 2011/0216451 A1 | 9/2011 | Haines et al. | |
| 2011/0320056 A1 | 12/2011 | Brown et al. | |
| 2012/0286729 A1 * | 11/2012 | Yegin | B60L 3/04 |
| | | | 320/109 |
| 2013/0214738 A1 | 8/2013 | Chen et al. | |
| 2014/0025795 A1 | 1/2014 | Fiennnes | |
| 2014/0211345 A1 * | 7/2014 | Thompson | H02H 1/0061 |
| | | | 361/42 |
| 2015/0131333 A1 | 5/2015 | Grosso et al. | |
| 2015/0184881 A1 | 7/2015 | Bartenbach et al. | |
| 2015/0200533 A1 | 7/2015 | Simonin | |
| 2015/0372478 A1 | 12/2015 | Zhou et al. | |
| 2016/0339786 A1 | 11/2016 | Dickinson et al. | |
| 2017/0149235 A1 * | 5/2017 | Cui | H01H 83/04 |

OTHER PUBLICATIONS

Eaton, "EMCB", 'Smart circuit breakers and the never-ending utility tug of war', www.eaton.com FTC utilities EMCB index.htm, Nov. 7, 2016, 3 pp.

\* cited by examiner

ELECTRIC VEHICLE CHARGING CIRCUIT BREAKER

CROSS-REFERENCE TO RELATED APPLICATIONS

This application is a continuation of, and claims priority from, U.S. patent application Ser. No. 15/350,244, filed Nov. 14, 2016, entitled "ELECTRIC VEHICLE CHARGING CIRCUIT BREAKER", the contents of which are incorporated herein by reference.

BACKGROUND

Field

The disclosed concept pertains generally to electric vehicle supply equipment and, more particularly, to an electric vehicle charging circuit breaker.

Background Information

An electric vehicle charging station, also called an electric vehicle charging station, electric recharging point, charging point, and electric vehicle supply equipment, is an element in an infrastructure that supplies electric energy for the recharging of electric vehicles, plug-in hybrid electric-gasoline vehicles, or semi-static and mobile electrical units such as exhibition stands.

An electric vehicle charging station is a device that safely allows electricity to flow. These charging stations and the protocols established to create them are known as electric vehicle supply equipment, and they enhance safety by enabling two-way communication between the charging station and the electric vehicle.

The 1996 NEC and California Article 625 define electric vehicle supply equipment as being the conductors, including the ungrounded, grounded, and equipment grounding conductors, the electric vehicle connectors, attachment plugs, and all other fittings, devices, power outlets or apparatus installed specifically for the purpose of delivering energy from premises wiring to an electric vehicle.

Electric vehicle supply equipment is defined by the Society of Automotive Engineers (SAE) recommended practice J1772 and the National Fire Protection Association (NFPA) National Electric Code (NEC) Article 625. While the NEC defines several safety requirements, J1772 defines the physical conductive connection type, five pin functions (i.e., two power pins (Hot1 and Hot2 or neutral; or Line 1 and Line 2), one ground pin, one control pilot pin, and one proximity pin), the electric vehicle supply equipment to handshake with the electric vehicle over the pilot pin, and how both parts are supposed to function.

Two-way communication seeks to ensure that the current passed to the electric vehicle is both below the limits of the electric vehicle charging station itself and below the limits of what the electric vehicle can receive. There are additional safety features, such as a safety lock-out that does not allow current to flow from the electric vehicle charging station until the electric vehicle connector or electric vehicle plug is physically inserted into the electric vehicle and the electric vehicle is ready to accept energy.

Electric vehicle supply equipment are designed to be added to an existing electrical distribution system and provide the basic functionality of charging the electric vehicle. It would be beneficial to improve the ease of use and functionality of electric vehicle supply equipment.

There is room for improvement in electric vehicle supply equipment.

SUMMARY

This need and others are met by embodiments of the disclosed concept in which an electric vehicle charging circuit breaker provides circuit protection and electric vehicle charging functions as well as displaying information.

In accordance with aspects of the disclosed concept, an electric vehicle charging circuit breaker for charging an electric vehicle with power from a power source, the electric vehicle charging circuit breaker comprising: a circuit protection unit structured to provide circuit protection between the power source and the electric vehicle; an electric vehicle charging unit structured to control charging of the electric vehicle; a metering unit structured to meter power flowing between the power source and the electric vehicle; and a display unit structured to display information including at least one of metering information and a status of electric vehicle charging.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

Figure 1:
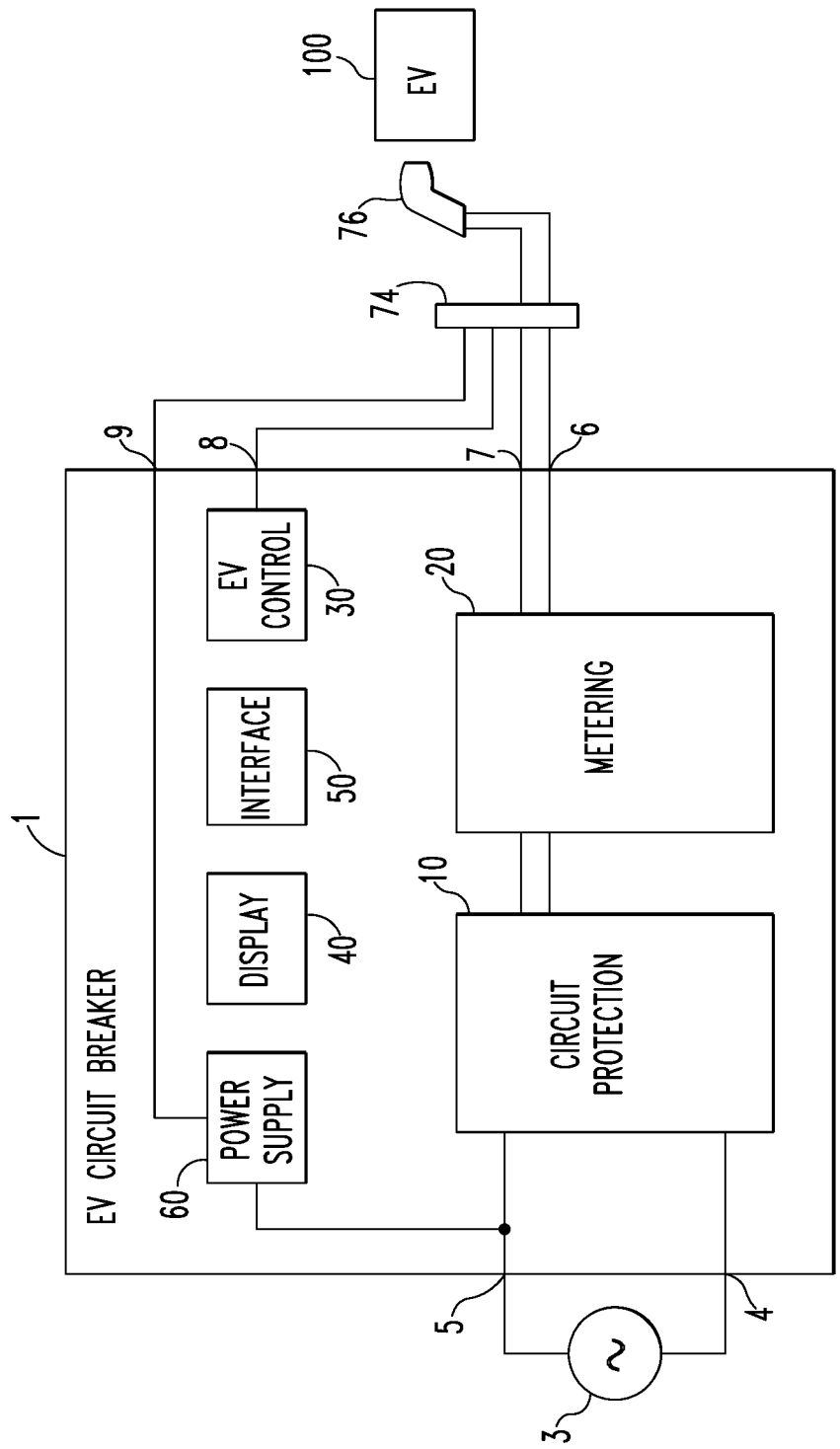
FIG. 1 is a block diagram in schematic form of an electric vehicle charging circuit breaker in accordance with an example embodiment of the disclosed concept.
Figure 2A:
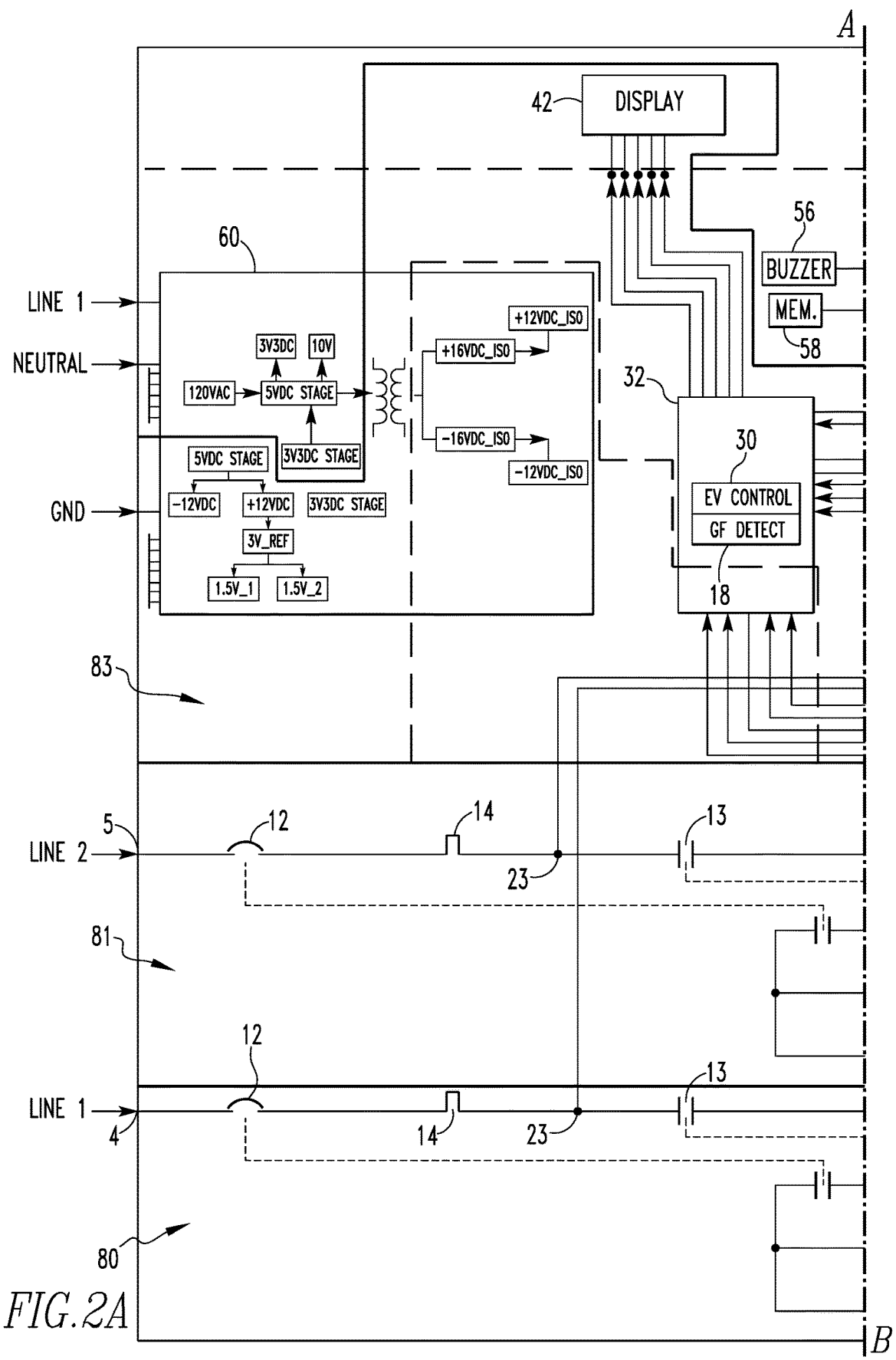
FIGS. 2A and 2B are a circuit diagram of an electric vehicle charging circuit breaker in accordance with an example embodiment of the disclosed concept.
Figure 2B:
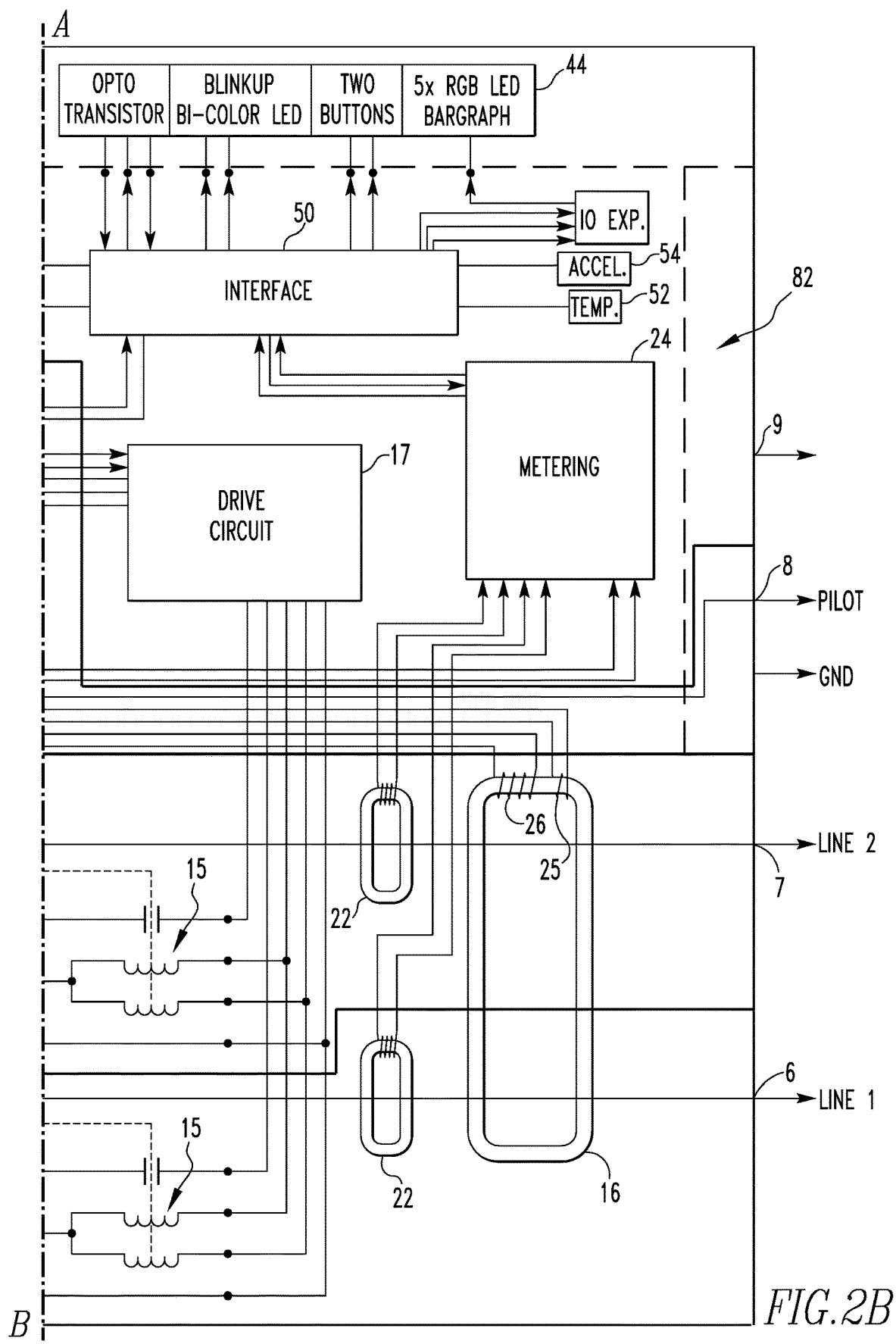
Figure 3:
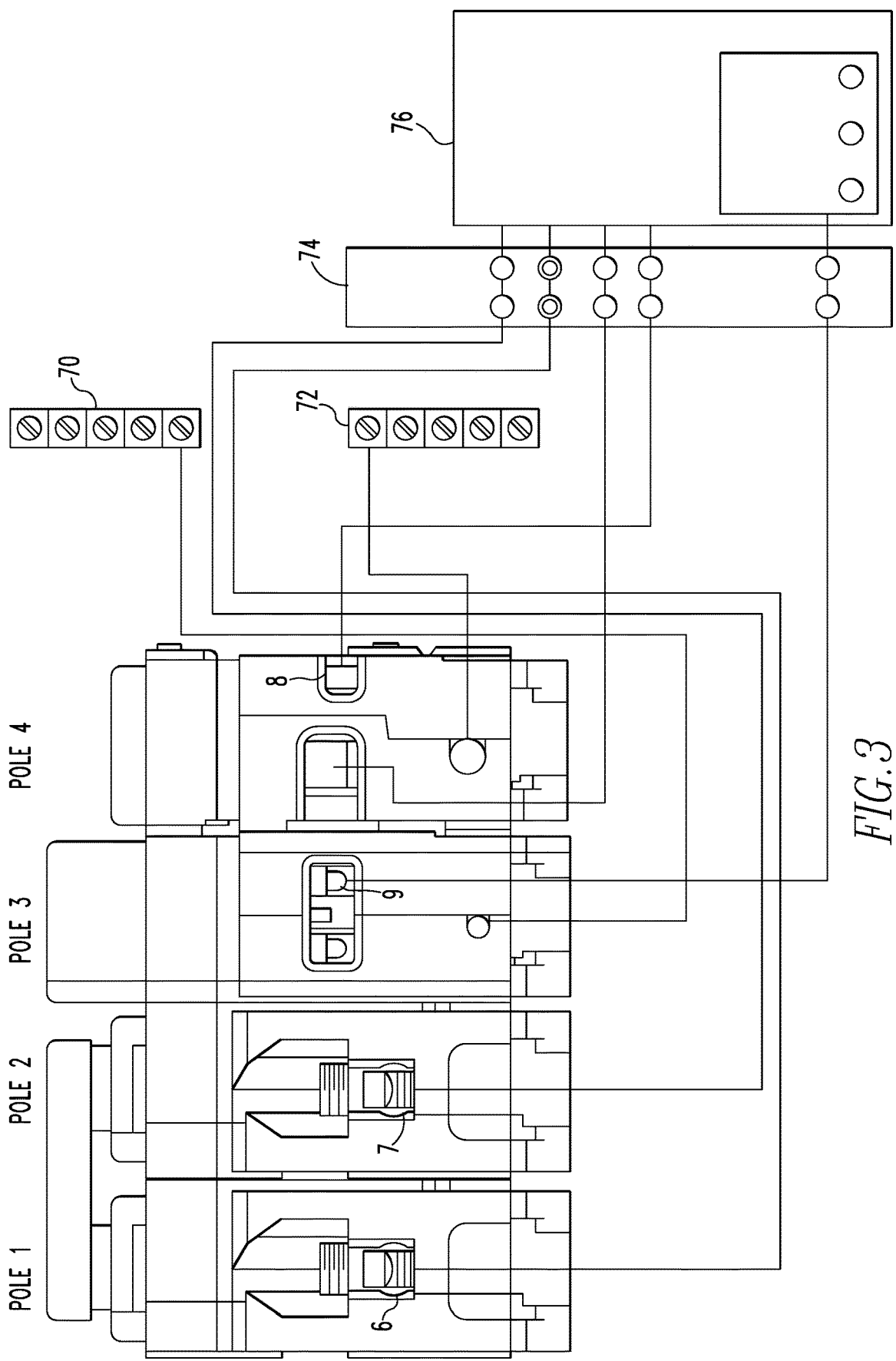
FIG. 3 is an external view of an electric vehicle charging circuit breaker in accordance with an example embodiment of the disclosed concept.

FIG. 1 is a block diagram in schematic form of an electric vehicle charging circuit breaker 1 in accordance with some example embodiments of the disclosed concept and FIGS. 2A and 2B are a more detailed circuit diagram of the electric vehicle charging circuit breaker 1 in accordance with an example embodiment of the disclosed concept. FIG. 3 is an external view of the electric vehicle charging circuit breaker 1 in accordance with an example embodiment of the disclosed concept. Some interconnections between components of the electric vehicle charging circuit breaker 1 have been omitted in order to more clearly illustrate the disclosed concept. However, one having ordinary skill in the art will understand that the various components of the electric vehicle charging circuit breaker 1 may be interconnected in various ways in order to provide the functionality of the electric vehicle charging circuit breaker 1.

The electric vehicle charging circuit breaker 1 includes a circuit protection unit 10, a metering unit 20, an electric vehicle charging control unit 30, a display unit 40, an interface unit 50, and a power supply unit 60. The electric vehicle charging circuit breaker 1 also includes a housing 2, input terminals 4,5 and output terminals 6,7,8,9. The output terminals 6,7,8,9 may include charging output terminals 6,7 used for providing power for charging an electric vehicle 100, a pilot output terminal 8 used for providing a pilot signal that is used in the electric vehicle charging process, and a DC supply terminal 9 that is used to provide DC power used in the electric vehicle charging process. The electric vehicle charging circuit breaker 1 is structured to receive power from a power source 3 via the input terminals 4,5, and to provide the power for charging the electric vehicle 100 via the charging output terminals 6,7. The electric vehicle charging circuit breaker 1 is also structured to provide a pilot signal via the pilot output terminal 8 and DC supply power via the DC supply terminal 9. The output terminals 6,7,8,9 may be connected to a junction box 74 which may in turn be connected to an electric vehicle charging connector 76, which may in turn be connected to the electric vehicle 100. The outputs of the output terminals 6,7,8,9 may be provided to the electric vehicle 100 via the junction box 74 and the electric vehicle charging connector 76.

The electrical vehicle charging circuit breaker 1 includes a circuit protection unit 10. The circuit protection unit 10 is structured to detect a fault (e.g., without limitation, overcurrent, etc.) based on power flowing between the input terminals 4,5 and the charging output terminals 6,7 and to trip open separable contacts between the input terminals 4,5 and the charging output terminals 6,7 in response to the detected fault. In some example embodiments of the disclosed concept, the circuit protection unit 10 includes a thermal/magnetic trip unit. However, it is also contemplated that the circuit protection unit 10 may, in some example embodiments, instead include an electronic trip unit and corresponding sensors.

Components of the circuit protection unit 10 in accordance with an example embodiment of the disclosed concept are shown in more detail in FIGS. 2A and 2B. The circuit protection unit 10 may include a thermal/magnetic trip unit including separable contacts 12 electrically connected between the input terminals 4,5 and the charging output terminals 6,7 and bi-metal plates 14 electrically connected between the input terminals 4,5 and the charging output terminals 6,7. The bi-metal plates 14 may interact with an operating mechanism (not shown) to cause the separable contacts 12 to trip open when current flowing between the input terminals 4,5 and the charging output terminals 6,7 exceeds a predetermined threshold level (e.g., without limitation, an overcurrent condition). The circuit protection unit 10 also includes a trip coil (not shown) that causes the operating mechanism to cause the separable contacts 12 to trip open when current flowing between the input terminals 4,5 and the charging output terminals 6,7 exceeds a predetermined threshold level. In some example embodiments, the coil provides instantaneous protection for excessive overcurrent while the bi-metal plates 14 provide protection for sustained lower overcurrent conditions.

The circuit protection unit 10 may also include secondary separable contacts 13 and secondary operating mechanisms 15 structured to open the secondary separable contacts 13. For example and without limitation, the secondary operating mechanisms 15 may be solenoids structured to open the secondary separable contacts 13. In some example embodiments, the secondary operating mechanisms 15 may be controlled electronically via a drive circuit 17. For example, a control signal may be provided to the drive circuit 17 to cause the drive circuit 17 to operate the secondary operating mechanisms 15 to open the secondary separable contacts 13. The control signal may be provided to the drive circuit 17 in response to detecting a fault. It is also contemplated that the control signal may be provided to the drive circuit 17 for various other reasons. For example and without limitation, the control signal may be provided to the drive circuit 17 by the electric vehicle charging control unit 30 in order to start or stop charging the electric vehicle 100.

The circuit protection unit 10 may also include a ground fault current sensor 16 and a ground fault detection unit 18. The ground fault current sensor 16 is structured to sense a difference in current flowing between one set of input and output charging terminals 4,6 and the other set of input and output charging terminals 5,7. The ground fault current sensor 16 may be, for example and without limitation, one or more current transformers. The ground fault detection unit 18 is structured to determine whether a ground fault is present based on the sensed current. For example, a difference in current flowing between one set of input and output charging terminals 4,6 and the other set of input and output charging terminals 5,7 may be an indication of a ground fault. In response to detecting a ground fault, the ground fault detection unit 18 may output a control signal to the drive circuit 17 that causes the drive circuit 17 to operate the secondary operating mechanisms 15 to open the secondary separable contacts 13.

In some example embodiments of the disclosed concept, ground fault current sensor 16 includes a sensing coil 26 and a self-test coil 25. The sensing coil 26 is used to sense a difference in current flowing between one set of input and output charging terminals 4,6 and the other set of input and output charging terminals 5,7. The self-test coil 25 is used in conjunction with the sensing coil 26 to test the ground fault detection functionality of the circuit protection unit 10. For example and without limitation, the ground fault detection unit 18 is structured to receive and compare outputs of the sensing coil 26 and the self-test coil 25. The ground fault detection unit 18 determines that the ground fault functionality is operating properly if the output of the sensing coil 26 is a predetermined number of times the magnitude of the output of the self-test coil 25. In one example embodiment of the disclosed concept, the sensing coil 26 has about 1000 turns and the self-test coil 25 has about 10 turns. If the ground fault functionality is working properly the ground fault detection unit 18 should determine that the output of the sensing coil 26 is about 100 times the output of the self-test coil 25. If the ground fault detection unit 18 determines that the output of the sensing coil 26 is not the predetermined number of times the output of the self-test coil 25, the ground fault detection unit 18 may output an alarm signal indicating an error in the ground fault functionality of the circuit protection unit 10.

In the example embodiments of FIGS. 1 and 2A/2B, a thermal/magnetic trip unit is disclosed as providing overcurrent protection. However, it is contemplated that overcurrent protection may be provided in other manners without departing from the scope of the disclosed concept. For example and without limitation, an electronic trip unit and corresponding sensor(s) (e.g., without limitation, current sensor, temperature sensor, etc.) may be employed to provide overcurrent protection or other types of circuit protection without departing from the scope of the disclosed concept.

Referring back to FIG. 1, the electric vehicle charging circuit breaker 1 further includes the metering unit 20. The metering unit 20 is structured to provide metering for power flowing between the input terminals 4,5 and the charging output terminals 6,7. The metering unit 20 may provide, for example, metering of the voltage and/or current of power flowing between the input terminals 4,5 and the charging output terminals 6,7.

Referring to FIGS. 2A/2B, the metering unit 20 in accordance with an example embodiment of the disclosed concept is shown. The metering unit 20 includes current sensors 22 structured to sense current flowing between the input terminals 4,5 and the output charging terminals 6,7. The current sensors 22 may be current transformers and any other suitable type of current sensor. The metering unit 20 further includes voltage sensing connections 23 that electrically connect a metering processing unit 24 to points between the input terminals 4,5 and the output charging terminals 6,7 so as to allow the metering processing unit 24 to sense voltage of the power flowing between the input terminals 4,5 and the charging output terminals 6,7.

The metering processing unit 24 is structured to process the current sensed by the current sensors 22 and the voltage sensed at the voltage sensing connections 23. For example, the metering processing unit 24 may meter characteristics of the power process the current sensed by the current sensors 22 and the voltage sensed at the voltage sensing connections 23 and output data indicative of the metered characteristics of the power flowing between the input terminals 4,5 and the output charging terminals 6,7. The characteristics may include, without limitation, magnitude of current, voltage, phase, total power, etc. The metering processing unit 24 may output the data to the display 40 so that it may be displayed. It is also contemplated that in some example embodiments of the disclosed concept, the data may be output elsewhere such as, for example and without limitation, to an external electronic device or to a network.

Referring back to FIG. 1, the electric vehicle charging circuit breaker 1 further includes the electric vehicle charging control unit 30. The electric vehicle charging control unit 30 is structured to control when the electric vehicle charging circuit breaker 1 charges the electric vehicle 100. The electric vehicle charging control unit 100 is also structured provide the pilot signal to the pilot output terminal 8.

Referring to FIGS. 2A/2B, an electric vehicle charging control unit 30 in accordance with an example embodiment of the disclosed concept is shown. The electric vehicle charging control unit 30 is structured to generate the pilot signal that is provided to the pilot terminal 8. The pilot signal may be, for example and without limitation, a J1772 compliant pilot signal. The electric vehicle charging control unit 30 also electrically connected to the drive circuit 17 and may provide the control signal to the drive circuit 17 to cause the drive circuit 17 to operate the secondary operating mechanisms 15 to open or close the secondary separable contacts 13. For example and without limitation, the electric vehicle charging control unit 30 may provide the control signal to the drive circuit 17 to cause the drive circuit 17 to operate the secondary operating mechanisms 15 to close the secondary separable contacts 13 in order to begin charging of the electric vehicle 100 and the electric vehicle charging control unit 30 may provide the control signal to the drive circuit 17 to cause the drive circuit 17 to operate the secondary operating mechanisms 15 to open the secondary separable contacts 13 in order to stop charging of the electric vehicle 100.

The electric vehicle charging control unit 30 may also be electrically connected to the display unit 40. The electric vehicle control unit 30 may provide various information to be displayed on the display unit 40. For example and without limitation, the information may include whether or not the electric vehicle 100 is being charged.

In some example embodiments of the disclosed concept, the ground fault detection unit 18 and the electric vehicle charging control unit 30 may be combined into a common processing unit 32, as is shown in FIGS. 2A/2B. However, it will be appreciated by those having ordinary skill in the art that the ground fault detection unit 18 and the electric vehicle charging control unit 30 may also be provided on separate components without departing from the scope of the disclosed concept.

The display unit 40 is structured to display various information. In some example embodiments of the disclosed concept, the display unit 40 may be any type of display unit capable of displaying information. In some example embodiments of the disclosed concept, the display unit 40 may be a type of display capable of displaying text and/or graphical information (e.g., without limitation, an LED display, OLED display, LCD display, or other similar types of displays). However, it will also be appreciated by those having ordinary skill in the art that the display unit 40 may also be other types of devices capable of displaying information such as, without limitation, one or more LED indicators.

The display unit 40 may be connected to other components of the electric vehicle charging circuit breaker 1 so as to receive various information that is may subsequently display. For example and without limitation, the display unit 40 may receive information from the electric vehicle charging unit 30 and/or the metering unit 20 directly from these components or via other components such as, without limitation, the interface unit 50, and subsequently display the information. The information may include, for example and without limitation, various metering information and/or information on whether the electric vehicle 100 is being charged. It is also contemplated that other information may be provided to and displayed by the display unit 40. For example and without limitation, information on whether the primary or secondary contacts 12,13 are open may be displayed.

Referring to FIGS. 2A/2B, in some example embodiments of the disclosed concept, the display unit 40 may include a primary display unit 42 and a secondary display/interface unit 44. The primary display unit 42 and the secondary display/interface unit 44 may be different types of displays. For example and without limitation, the primary display unit 42 may be an OLED display and the secondary display unit 44 may include various LED indicators and interface elements. Different information may be displayed by the primary display unit 42 and the secondary display/interface unit 44. For example and without limitation, the primary display unit 42 may display information received from the electric vehicle charging control unit 30 and the secondary display/interface unit 44 may display information received from the metering unit 20. The secondary display/interface unit 44 may also include interface elements such as, without limitation, one or more buttons that a user may interact with to cause the electric vehicle charging circuit breaker 1 to perform various functions (e.g., without limitation, a reset function, an identify function, etc.). The secondary display/interface unit 44 may also include an optical interface (e.g., without limitation, an opto-transistor) that may be used to input information into the electric vehicle charging circuit breaker 1.

In some example embodiments of the disclosed concept, secondary display/interface unit 44 includes the optical interface and a blinkup bi-color LED. The optical interface and blinkup bi-color LED are connected to the interface unit 50 and may be used in conjunction with an external device (e.g., without limitation, a mobile phone, an LED control device, etc.) to connect the interface unit 50 with a wireless network (e.g., without limitation, a Wi-Fi network). For example and without limitation, the external device may communicate information (e.g., without limitation, network connection information) to the interface unit 50 via the optical interface. For example, the external device may encode the information in a light pattern that is captured by the optical interface. The interface unit 50 may output information (e.g., without limitation, a confirmation of connection) to the external device by causing the blinkup bi-color LED to output a light pattern that may be captured by the external device. It will be appreciated by those having ordinary skill in the art that other types of information (e.g., status information, control commands, configuration information) may be exchanged between the external device and the interface unit 50 via the optical interface and blinkup bi-color LED without departing from the scope of the disclosed concept.

The electric vehicle charging circuit breaker 1 also includes an interface unit 50. The interface unit 50 may provide an interface between different components inside the electric vehicle charging circuit breaker 1 and/or between components inside the electric vehicle charging circuit breaker 1 and components and/or devices outside the electric vehicle charging circuit breaker 1. For example and without limitation, the interface unit 50 may provide an interface between the metering unit 20 and an external device such as, without limitation, a computer, to allow the computer to read information output by the metering unit 20. It will also be appreciated by those having ordinary skill in the art that other components may be connected to external devices or components other than the metering unit 20. It will further be appreciated by those having ordinary skill in the art that external devices and/or components may input information into the electric vehicle charging circuit breaker 1 via the interface unit 50 as well.

The interface unit 50 may include a processor and have an associated memory 58. The processor may be, for example and without limitation, a microprocessor, a microcontroller, or some other suitable processing device or circuitry, that interfaces with the memory 58 or another suitable memory. The memory 58 may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. It will also be appreciated that the memory 58 may be included in the interface unit 50. The memory 58 may store one or more routines which, when executed by the processor, cause the interface unit 50 to implement at least some of its functionality.

In some example embodiments of the disclosed concept, the interface unit 50 may be coupled to one or more sensors such as a temperature sensor 52 or an accelerometer 54. The interface unit 50 may monitor the outputs of the sensors and activate alarm, such as a buzzer 56 or one or more indicators on the secondary display/interface unit 44, when the outputs of one or more of the sensors exceed predetermined thresholds. For example and without limitation, the temperature sensor 52 may be arranged to monitor the ambient temperature of the interior of the electric vehicle charging circuit breaker 1 and the interface unit 50 may monitor the output of the temperature sensor 52 and activate the buzzer 56 and an indicator on the secondary display/interface unit 44 when the ambient temperature exceeds a predetermined threshold level. Additionally, in some example embodiments of the disclosed concept, the interface unit 50 may output a control signal to the circuit protection unit 10 when the outputs of one or more of the sensors exceed predetermined thresholds and the circuit protection unit 10 may, in turn, cause the secondary contacts 13 to open in response to the control signal. For example and without limitation, the interface unit 50 may output the control signal to the circuit protection unit 10 when the ambient temperature sensed by the temperature sensor 52 exceeds a predetermined threshold and the circuit protection unit 10 may responsively cause the secondary contacts 13 to open.

In some example embodiments of the disclosed concept, the electric vehicle charging circuit breaker 1 is able to wirelessly communicate with an external device via an opto-transistor included in the secondary display/interface unit 44. In some example embodiments of the disclosed concept, the interface unit 50 may include a wireless communication unit that allows the interface unit 50 to wirelessly communicate with the external device using a wireless communication protocol such as, without limitation, Wi-Fi, Bluetooth, Zigbee, or any other suitable wireless communication protocol. It will be appreciated by those having ordinary skill in the art that the wireless communication unit may be located outside the interface unit 50 or omitted from the electric vehicle charging circuit breaker 1 without departing from the scope of the disclosed concept.

The electric vehicle charging circuit breaker 1 also includes the power supply unit 60. The power supply unit 60 is structured to convert power received from the power source 3 and to provide it to the various components in the electric vehicle charging circuit breaker 1. For example, the power supply unit 60 may convert the power received from the power source 3 from AC power to DC power. The power supply unit 60 may condition the power received from the power source 3 in additional manners such as, without limitation, converting the voltage level of the power to a level suitable for use by components in the electric vehicle charging circuit breaker 1. In some example embodiments of the disclosed concept, the power supply unit 60 is structured to simultaneously output multiple different levels of power. For example and without limitation, the power supply unit 60 may simultaneously output power at +12V, −12V, 3V, and 1.5V. While these are examples of power outputs that may be provided by the power supply unit 60, it will be appreciated by those having ordinary skill in the art that the power supply unit 60 may output power at different voltage levels without departing from the scope of the disclosed concept.

Referring to FIGS. 2A/2B, the power supply unit 60 may have different stages that provide outputs power at different voltage levels. While one architecture of different stages of the power supply unit 60 is shown in FIG. 2, it will be appreciated by those having ordinary skill in the art that different architectures may be employed in the power supply unit 60 without departing from the scope of the disclosed concept.

In some example embodiments of the disclosed concept, the electric vehicle charging circuit breaker 1 may be housed in an external housing for a four-pole circuit breaker. Referring to FIG. 3, an external view of the electric vehicle charging circuit breaker 1 in accordance with an example embodiment of the disclosed concept is shown in which the electric vehicle charging circuit breaker 1 is housed in the housing for a four-pole circuit breaker.

As shown in FIG. 3, the housing 2 includes four-poles. The first pole includes one of the charging output terminals 6 and the second pole includes the other of the charging output terminals 7. The first pole also includes one input terminal 4 (not shown in FIG. 3) and the second pole includes the other input terminal 5 (not shown in FIG. 3). The third pole includes the DC supply terminal 9 and the fourth pole includes the pilot output terminal 8. In some example embodiments of the disclosed concept, the third pole includes a neutral pigtail terminal and the fourth pole includes a ground pigtail terminal and an electric vehicle connector ground terminal. The neutral pigtail terminal and the ground pigtail terminal may be used to connect the electric vehicle charging circuit breaker 1 to a panel neutral 70 and a panel ground 72, respectively.

In some example embodiments of the disclosed concept, the electric vehicle charging circuit breaker 1 is connected to the junction box 74 which is in turn connected to the electric vehicle connector 76. For example and without limitation, the charging output terminals, the pilot output terminal 8, the DC supply terminal 9, and the electric vehicle connector ground terminal may be connected to terminals in the junction box 74 which may in turn be connected to corresponding terminals in the electric vehicle connector 76. In this manner, power and signaling may be provided from the electric vehicle charging circuit breaker 1 to the electric vehicle connector 76. The electric vehicle connector 76 may in turn be connected to the electric vehicle 100 (shown in FIG. 1) in order to provide power and signaling to the electric vehicle 100 to charge the electric vehicle 100.

Referring back to FIGS. 2A/2B, the inside of the housing 2 may be divided into various compartments in some example embodiments of the disclosed concept. For example and without limitation, the housing 2 may include four compartments 80,81,82,83. The first and second compartments 80,81 may correspond to the first and second poles, respectively. The first and second compartments 80,81 may include, without limitation, the primary and secondary contacts 12,13, the secondary operating mechanisms 15, the ground fault sensor 16, and the current sensors 22.

The third compartment 82 may include metering unit 24, the drive circuit 17, the interface unit 50, the secondary display/interface unit 44, and the remaining portion of the power supply unit 60 (e.g., the remaining stages of the power supply unit 60). The fourth compartment 83 may include the ground fault sensing unit 18, the electric vehicle control unit 30, the primary display unit 42, and a portion of the power supply unit 60 (e.g., some of the stages of the power supply unit 60).

In some example embodiments of the disclosed concept, outputs of the first through fourth compartments 80,81,82,83 correspond to outputs of the respective poles of the electric vehicle charging circuit breaker 1. For example, the output of the first compartment 80 and the first pole is one of the charging output terminals 6, the output of the second compartment 81 and the second pole is the other of the charging output terminals 7, the output of the third compartment 82 and the third pole is the DC supply terminal 9, and the output of the fourth compartment 83 and the fourth pole is the pilot output terminal 8.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. An electric vehicle charging circuit breaker for charging an electric vehicle with power from a power source, the electric vehicle charging circuit breaker comprising:
a circuit protection unit structured to provide circuit protection between the power source and the electric vehicle;
an electric vehicle charging control unit structured to control charging of the electric vehicle; and
a metering unit structured to meter power flowing between the power source and the electric vehicle,
wherein the circuit protection unit includes a ground fault sensor structured to sense current flowing through the electric vehicle charging circuit breaker and a ground fault detection unit structured to detect a ground fault condition based on current sensed by the ground fault sensor,
wherein the ground fault sensor includes a sensing coil and a self-test coil, and
wherein the ground fault detection unit is structured to determine whether ground fault detection functionality is operating properly based on a difference in magnitude between an output of the sensing coil and an output of the self-test coil.

2. The electric vehicle charging circuit breaker of claim 1, wherein the circuit protection unit includes primary separable contacts and secondary separable contacts, and wherein the circuit protection unit is structured to open the primary separable contacts in response to a detected overcurrent condition and to open the secondary separable contacts in response to a detected ground fault condition.

3. The electric vehicle charging circuit breaker of claim 2, wherein the ground fault detection unit is structured to output a signal to cause the secondary separable contacts to open in response to the detected ground fault condition.

4. The electric vehicle charging circuit breaker of claim 2, wherein the circuit protection unit includes a thermal/magnetic trip unit structured to an overcurrent condition and to cause the primary separable contacts to open in response to the detected overcurrent condition.

5. The electric vehicle charging circuit breaker of claim 2, wherein the electric vehicle charging control unit is structured to control the secondary separable contacts to open to prevent charging of the electric vehicle and to close to allow charging of the electric vehicle.

6. The electric vehicle charging circuit breaker of claim 2, wherein the circuit protection unit includes solenoids structured to open and close the secondary separable contacts and a drive circuit structured to control the solenoids to open and close the secondary separable contacts.

7. The electric vehicle charging circuit breaker of claim 1, wherein the electric vehicle charging control unit is structured to generate a pilot signal to be output to the electric vehicle.

8. The electric vehicle charging circuit breaker of claim 7, wherein the pilot signal is a J1772 compliant pilot signal.

9. The electric vehicle charging circuit breaker of claim 1, wherein the metering unit includes a metering processing unit, current sensors, and voltage sensing connections, and wherein the metering processing unit is structured to meter power flowing through the electric vehicle charging circuit breaker based on outputs of the voltage sensing connections and current sensors.

10. The electric vehicle charging circuit breaker of claim 1, further comprising:
a power supply unit structured to convert power from the power source and to output the converted power to at least one of the circuit protection unit, the electric vehicle charging control unit, the metering unit, and the display unit.

11. The electric vehicle charging circuit breaker of claim 10, wherein the power supply unit includes multiple stages and is structured to output power a multiple voltage levels simultaneously.

12. The electric vehicle charging circuit breaker of claim 1, further comprising:
an interface unit structured to provide interfacing between at least one of the circuit protection unit, the electric vehicle control unit, and the metering unit and at least one external device.

13. The electric vehicle charging circuit breaker of claim 12, wherein the interface unit is structured to use a wireless communication protocol to interface with the external device.

14. The electric vehicle charging circuit breaker of claim 12, further comprising:
one or more sensors structured to monitor characteristics of the electric vehicle charging circuit breaker; and
one or more indicators,
wherein the interface unit is structured to monitor outputs of the one or more sensors and to activate one or more of the indicators in response to determining that one or more of the outputs of the one or more sensors exceeds a corresponding predetermined threshold.

15. The electric vehicle charging circuit breaker of claim 14, wherein the one or more sensors includes a temperature sensor structured to monitor an ambient temperature inside the electric vehicle charging circuit breaker, wherein the one or more of the indicators includes an audible indicator, and wherein the interface unit is structured to activate the audible indicator in response to determining that the ambient temperature inside the electric vehicle charging circuit breaker exceed a predetermined threshold ambient temperature level.

16. The electric vehicle charging circuit breaker of claim 1, further comprising:
a four-pole circuit breaker housing including a first pole, a second pole, a third pole, and a fourth pole, wherein the first and second poles each include a charging output terminal structured to provide power to the electric vehicle, wherein the third pole includes a direct current supply terminal structured to provide a direct current supply voltage to the electric vehicle, and the fourth pole includes a pilot signal terminal structured to provide a pilot signal to the electric vehicle structured to provide a direct current supply voltage to the electric vehicle.

17. The electric vehicle charging circuit breaker of claim 1, wherein the sensing coil has a first number of turns and the self-test coil has a second number of turns, and wherein the first number of turn is greater than the second number of turns.

18. The electric vehicle charging circuit breaker of claim 17, wherein the ground fault detection unit is structured to determine that the ground fault detection functionality is operating properly if a magnitude of the output of the sensing coil is a predetermined number of times a magnitude of the output of the self-test coil, and wherein the ground fault detection unit is structured to determine that the ground fault detection functionality is not operating properly if the magnitude of the output of the sensing coil is not the predetermined number of times the magnitude of the output of the self-test coil.

19. An electric vehicle charging circuit breaker for charging an electric vehicle with power from a power source, the electric vehicle charging circuit breaker comprising:
a circuit protection unit structured to provide circuit protection between the power source and the electric vehicle; and
an electric vehicle charging control unit structured to control charging of the electric vehicle,
wherein the circuit protection unit includes a ground fault sensor structured to sense current flowing through the electric vehicle charging circuit breaker and a ground fault detection unit structured to detect a ground fault condition based on current sensed by the ground fault sensor,
wherein the ground fault sensor includes a sensing coil and a self-test coil, and
wherein the ground fault detection unit is structured to determine whether ground fault detection functionality is operating properly based on a difference in magnitude between an output of the sensing coil and an output of the self-test coil.

20. An electric vehicle charging circuit breaker for charging an electric vehicle with power from a power source, the electric vehicle charging circuit breaker comprising:
a ground fault sensor structured to sense current flowing through the electric vehicle charging circuit breaker, that ground fault sensor having a sensing coil and a self-test coil;
a ground fault detection unit structured to detect a ground fault condition based on current sensed by the ground fault sensor and to determine whether ground fault detection functionality is operating properly based on a difference in magnitude between an output of the sensing coil and an output of the self-test coil; and
an electric vehicle charging control unit structured to control charging of the electric vehicle,
wherein the sensing coil has a first number of turns and the self-test coil has a second number of turns, and wherein the first number of turn is greater than the second number of turns.

* * * * *